(12) United States Patent
Mehrotra et al.

(10) Patent No.: US 9,734,171 B2
(45) Date of Patent: Aug. 15, 2017

(54) INTELLIGENT REDISTRIBUTION OF DATA IN A DATABASE

(75) Inventors: Gaurav Mehrotra, Pune (IN); Abhinay R. Nagpal, Pune (IN); Yan Wang Stein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 12/639,330

(22) Filed: Dec. 16, 2009

(65) Prior Publication Data
US 2011/0145242 A1 Jun. 16, 2011

(51) Int. Cl.
G06F 7/00 (2006.01)
G06F 17/30 (2006.01)

(52) U.S. Cl.
CPC .. *G06F 17/30306* (2013.01); *G06F 17/30997* (2013.01)

(58) Field of Classification Search
None
See application file for complete search history.

(56) References Cited

U.S. PATENT DOCUMENTS

| | | | |
|---|---|---|---|
| 5,812,998 A * | 9/1998 | Tsutsumi et al. | 707/999.002 |
| 5,819,295 A * | 10/1998 | Nakagawa et al. | 707/999.203 |
| 5,881,379 A * | 3/1999 | Beier et al. | 707/999.1 |
| 6,023,699 A | 2/2000 | Knoblock et al. | |
| 6,269,375 B1 | 7/2001 | Ruddy et al. | |
| 6,952,737 B1 * | 10/2005 | Coates et al. | 709/229 |
| 7,000,141 B1 | 2/2006 | Karlsson et al. | |
| 7,136,883 B2 * | 11/2006 | Flamma et al. | 707/999.204 |
| 7,509,524 B2 | 3/2009 | Patel et al. | |
| 7,526,508 B2 | 4/2009 | Tan et al. | |
| 7,539,988 B1 | 5/2009 | Hersh | |
| 7,653,699 B1 * | 1/2010 | Colgrove et al. | 709/213 |
| 8,127,095 B1 * | 2/2012 | Colgrove et al. | 711/162 |
| 8,918,603 B1 * | 12/2014 | Arous et al. | 711/161 |
| 9,213,721 B1 * | 12/2015 | Faibish | G06F 17/30221 |
| 2004/0133577 A1 * | 7/2004 | Miloushev et al. | 707/10 |
| 2005/0097120 A1 | 5/2005 | Cooper et al. | |
| 2006/0195850 A1 | 8/2006 | Knight et al. | |
| 2006/0206507 A1 * | 9/2006 | Dahbour | 707/100 |

(Continued)

OTHER PUBLICATIONS

Jagadish, H.V., et al., "Baton: A Balanced Tree Structure for Peer to Peer Networks," Proceedings of the 31st VLDB Conference, 2005, pp. 661-672, Trondheim, NO, http://portal.acm.org/citation.cfm.

(Continued)

*Primary Examiner* — Jau-Shya Meng
(74) *Attorney, Agent, or Firm* — Kali-Law Group, P.C.

(57) ABSTRACT

The present invention includes a computer-implemented method including, classifying a data set in response to metadata corresponding to one or more data files located on a single database; and creating a data file topology comprising a data file identifier, a data file location and a data file type. The method may also include receiving a predetermined rule directory comprising a set of features corresponding to one or more file systems; and in response to the data file topology and the predetermined rule directory, reorganizing the data set such that at least a portion of the data set is moved to one of a set of new file systems having a predetermined optimized characteristic.

16 Claims, 4 Drawing Sheets

(56) References Cited

U.S. PATENT DOCUMENTS

2007/0016726 A1    1/2007  Zohar et al.
2009/0106210 A1    4/2009  Slezak et al.
2012/0221609 A1*   8/2012  Boor et al. .................... 707/822

OTHER PUBLICATIONS

Machdi, Imam, et al., "XML Data Partitioning Strategies to Improve Parallelism in Parallel Holistic Twig Joins," 3rd Intl Conf. on Ubiquitous Info Mgmt & Comm (ICUIMC), Jan. 15-16, 2009, pp. 471-480), Suwon, KR, http://portal.acm.org/citation.cfm?id=1516241.1516322.

Owens, Alisdair, et al., "Clustered TDB: A Clustered Triple Store for Jena," WWW 2009, Apr. 20-24, 2009; 10 pp., Madrid, ES, http://eprints.ecs.soton.ac.uk/16974/.

Ganesan, Prasanna, et al., "Online Balancing of Range-Partitioned Data with Applications to Peer-to-Peer Systems," Proceedings of the 30th Int'l Conf. on Very Large Databases, 2004, pp. 444-455), Toronto, CA, http://portal.acm.org/citation.cfm?id=1316729.

* cited by examiner

INTELLIGENT REDISTRIBUTION OF DATA IN A DATABASE

BACKGROUND AND SUMMARY

The present invention relates generally to database management and optimization, and more particularly to an automated method and/or apparatus adapted to intelligently distribute data files within a database based upon predetermined conditions. In one embodiment, the present invention includes a computer-implemented method including, on a single database, classifying a data set in response to metadata corresponding to one or more data files; and creating a data file topology comprising an data file identifier, a data file location and a data file type. The method described herein may also include receiving a predetermined rule directory comprising a set of features corresponding to one or more file systems; and in response to the data file topology and the predetermined rule directory, reorganizing the data set such that at least a portion of the data set is moved to one of a set of new file systems having a predetermined optimized characteristic. As described herein, the principles of the present invention may be embodied as a computer-implemented method, a computer program product, an apparatus, a system or any suitable combination thereof.

Other embodiments and features of the present invention are described in detail with reference to the following drawings.

DETAILED DESCRIPTION

Figure 1:
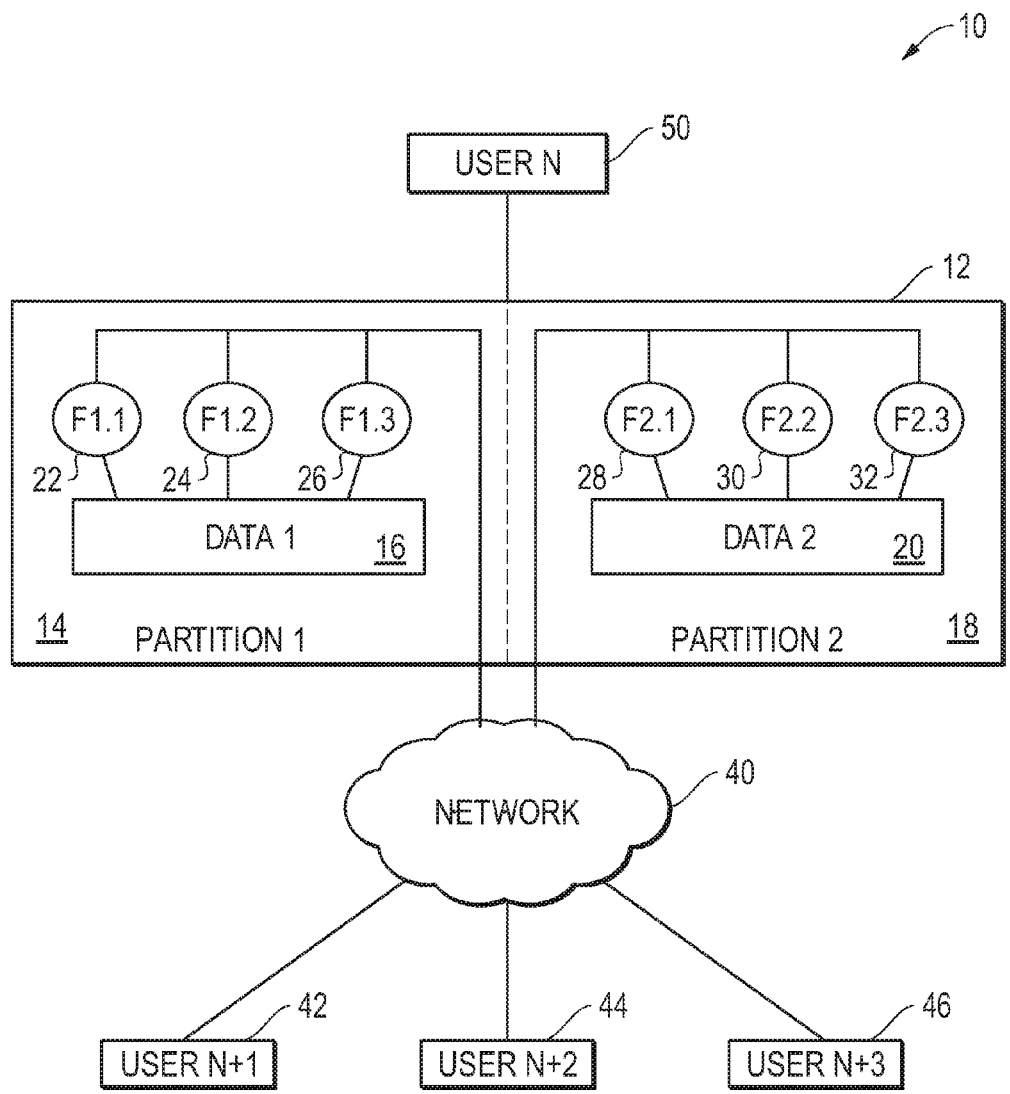
FIG. 1 is a schematic block diagram of an example operating environment in which the various embodiments of the present invention are operable.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.), or an embodiment combining software and hardware embodiments that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated date signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that may communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for embodiments of the present invention may be written in any combination of one or more programming languages, including an object oriented programming language such as Java, Smalltalk, C++ or the like or conventional procedural programming languages, such as the "C" programming language or similar programming languages. The programming code may execute entirely on the user's computer, partly on the user's computer, as a stand-alone software package, partly on the user's computer and partly on a remote computer or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a special purpose computer such as a server, or a smart phone, soft phone, personal digital assistant or any other machine adapted for executing programmable instructions in accordance with the description thereof set forth above.

As shown in FIG. 1, an example system 10 of the present invention includes a database 12 that is operatively coupled to a User N terminal 50 as well as one or more User N+M terminals 42, 44, 46 through a network 40. The example database 12 may be of any suitable type or standard means or apparatus for storing electronic data, including for example magnetic storage, electromagnetic storage, optical storage, opto-electronic storage as well as any suitable combination thereof. Example databases 12 may include for example the DB2 relational database management system developed by the assignee of the present application. As shown, the example database 12 may be partitioned into a first partition 14 and a second partition 18, as well as any other number of partitions or portions as desired by a user. In the example system 10, each of the first partition 14 and the second partition 18 have their own first data 16 and second data 20 stored thereon, respectively. In the example system 10, the first data 16 and the second data 20 may be distinct data sets, each including one or more data files, or they may be partially or completely overlapping data sets split among the first and second partitions 14, 18 at the user's discretion.

The data files located on the example database 12 may be formatted in stored in any suitable data file type or file system, including, but not limited to, a cache file system, an ext3 file system, JFS, JFS2, ReiserFS or any suitable combination or adaptation thereof. Different types of file systems may have different attributes such as for example faster read/write performance, maximized compression, maximized error recovery and/or maximized error handling capabilities, and/or maximized failure handling. Accordingly, the example database 12 may include one or more different types of file systems 22, 24, 26, 28, 30, 32, each of which may have a different set of attributes or advantages. The example database 12 may further include one or more catalogs, tables or logs that are indicative of various embodiments of the data 16, 20, such as for example the size of the data, the frequency with which it is accessed and/or updated, its encryption status and the like. As described further herein, the method of the embodiment redistributes or reconfigures the data 16, 20 into suitable file systems 22, 24, 26, 28, 30, 32 based upon an optimization between the characteristics of the data 16, 20 and the attributes or advantages of the specified file system 22, 24, 26, 28, 30, 32.

Figure 2:
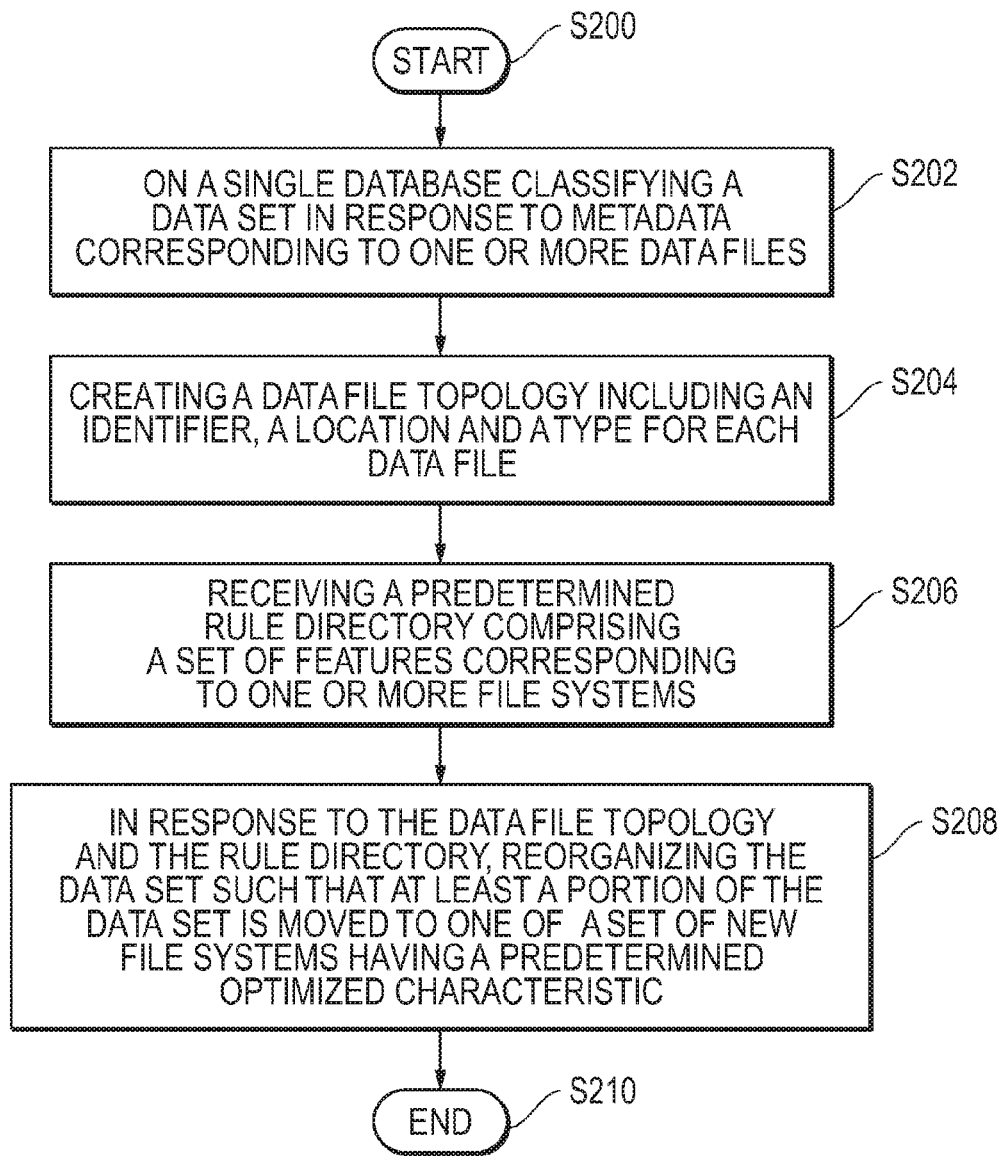
FIG. 2 is a flowchart depicting a method of redistributing data within a single database in accordance with an embodiment of the present invention.

A flowchart depicting the method of an embodiment is shown in FIG. 2. Starting at block S200, the method of this embodiment proceeds to block S202, which recites classifying a data set in response to metadata corresponding to one or more data files, wherein the data set and one or more data files reside on a single database. In one variation of the method of this embodiment, the single database may be configured into two or more partitions as shown in FIG. 1. A data file may include for example encrypted data, bootstrap data, application data, large object data, system data, enterprise data, or any combination thereof, i.e. large object data may also be encrypted. As used herein, the term enterprise data may refer to data accumulated by a business or individual during the course of its operation, including for example word processing data, financial data, multimedia files including music, video, images, web pages as well as payroll or accounting data and the like.

The term metadata includes a data set or datum that documents data about data elements or attributes such as a name, size, file system type, location on the database, ownership, authorship, accessibility, encryption status, creation date, modification date, modification frequency as well as any other self-referential attributes about the metadata itself including at least those listed above. Classification of the data set in response to the metadata functions to group and/or characterize each data file according to one or more of the attributes indicated in the metadata. As an example, each data file may be classified according to its encryption status or the frequency with which it is modified and/or accessed by a user. In another variation of the method of an embodiment, the method may include analyzing the metadata corresponding to one or more data files with an application programming interface (API). Alternatively, the method of the embodiment may include configuring the database with an innate analysis engine or catalog that creates and updates the metadata characteristics of each data file stored thereon.

Block S204 of the method of the embodiment recites creating a data file topology comprising a data file identifier, a data file location and a data file type. Although not so limited, the data file identifier may include any suitable data or datum that uniquely identifies a data file within the data set and/or within the database. Likewise, the data file location may include a physical location on the database on which the data file is stored, i.e. RAM, ROM, magnetic tape, hard drive or any other suitable data storage medium. As noted above, the data file type may include a designation referring to the file system employed in formatting and storing the data file, such as for example a cache file system, an ext3 file system, JFS, JFS2, ReiserFS or any suitable combination or adaptation thereof. The topology created according to block S204 of the method of the embodiment thus functions to map each data file according to its location on the database and the type of file system through which it is stored.

Block S206 of the method of the embodiment recites receiving a predetermined rule directory comprising a set of features corresponding to one or more data files. In one variation of the method of the embodiment, the rule directory may be a system automated set of rules or instructions that correlate a typical type of file system with an advantage or attribute thereof as well as instructions to locate data files having those attributes within the associated file system. Alternatively, the rule directory may be created, input and/or modified by a system administrator or database manager. As an example, the rule directory may note that a cache file system has maximized read/write capability, and thus the data that is accessed most frequently may be redistributed or relocated to the cache file system in order to maximize system performance. Likewise, the rule directory may note that a JFS2 file system has maximized error handling, and thus the data that is most critical and/or most easily corrupted may be redistributed or relocated to the JFS2 file system in order to maximize system performance. Other suitable features that the rule directory may employ include a compression characteristic, an error-recovery characteristic, or an error-failure characteristic.

Block S208 recites in response to the data file topology and the predetermined rule directory, reorganizing the data set such that at least a portion of the data set is moved to one of a set of new file systems having a predetermined optimized characteristic. As noted above, the data set may include two or more data files stored in two or more distinct file systems, and thus block S208 functions to move at least a portion of the data set to one of a set of new file systems, i.e., a cache file system or JFS2 file system, having a file system characteristic that is optimal for storing that particular data file.

Figure 3:
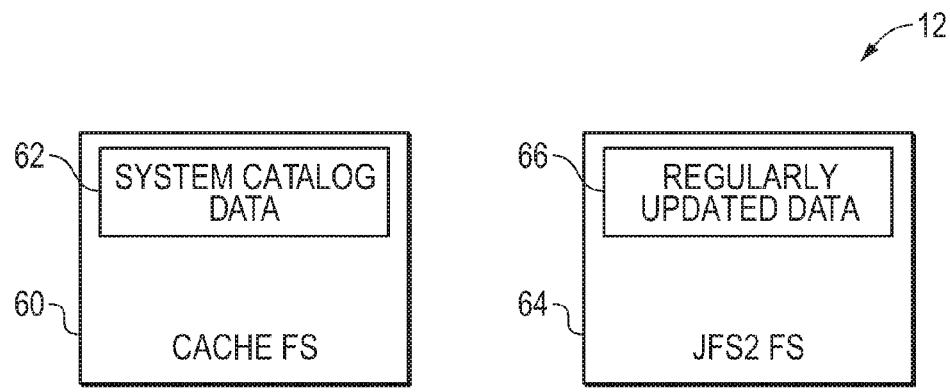
FIG. 3 is a schematic block diagram of a portion of the example operating environment in accordance with various embodiments of the present invention.
Figure 4:
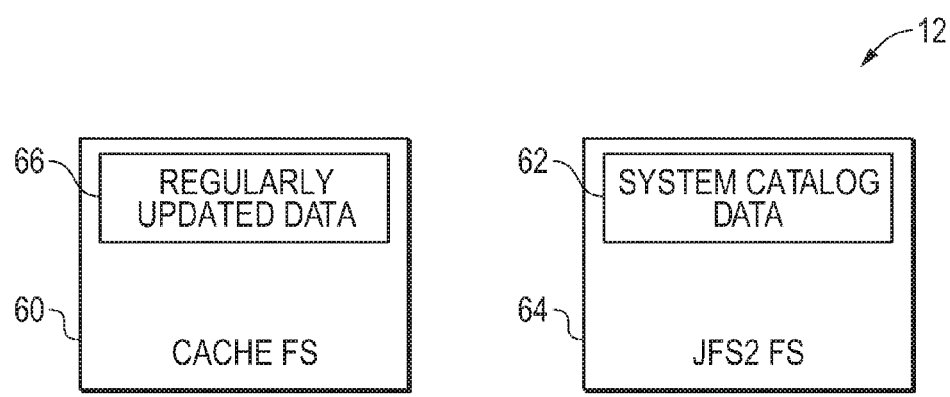
FIG. 4 is a schematic block diagram of a portion of the example operating environment in accordance with various embodiments of the present invention.

In one variation of the method of the embodiment, the method may include reading a system catalog to rank two or more data files in response to the frequency with which each of the two or more data files is accessed. Referring to FIG. 3, in which the example database 12 of FIG. 1 is shown schematically, a cache file system 60 includes system catalog data files 62 and a JFS2 file system 64 includes regularly updated data files 66. As noted above, the method of the embodiment may be implemented to optimize system performance and maximize use of the available storage in a database. Accordingly, by reading the system catalog file, the variation of the method of the embodiment may determine that the regularly updated data files 66 may be located on the cache file system 60 in order to make best use of the cache file system's 60 improved read/write characteristics as shown in FIG. 4. Likewise, in accordance with the method of the embodiment, the system catalog data file 62 may be redistributed and located on the JFS2 file system 64 in view of the maximized error-handling characteristics of the JFS2 file system 64.

It should be noted that the foregoing examples related to the variation of the method of the embodiment are applicable to any type of data file and any type of file system such as those noted above. That is, the predetermined optimized characteristic may include any of a read/write characteristic, a compression characteristic, an error-recovery characteristic, an error-failure characteristic or an error-handling characteristic—one, some or all of which may be features of any single file system used on the database. Accordingly, the method of the embodiment responds to the rule directory to redistribute and/or relocate data files onto the file system that most efficiently and securely stores and/or makes available the data in accordance with the rule directory.

In another variation of the method of the embodiment, the method includes rendering one or more data files accessible from a computer operatively coupled to a database on which the one or more files are located. Per the example embodiment shown in FIG. 1, the data files stored on the example database 12 may be operatively coupled to any number of users 50, 42, 44, 46, one of which may be an administrator or database manager such as User N 50. As used herein, the term user refers to a terminal that is connectable to the example database 12, wherein a terminal may include any suitable type of general purpose computer, such as for example a personal computer or a laptop computer, or a special purpose computer such as a server, or a smart phone, soft phone, personal digital assistant or any other machine adapted for executing programmable instructions in accordance with the description thereof set forth herein.

Figure 5:
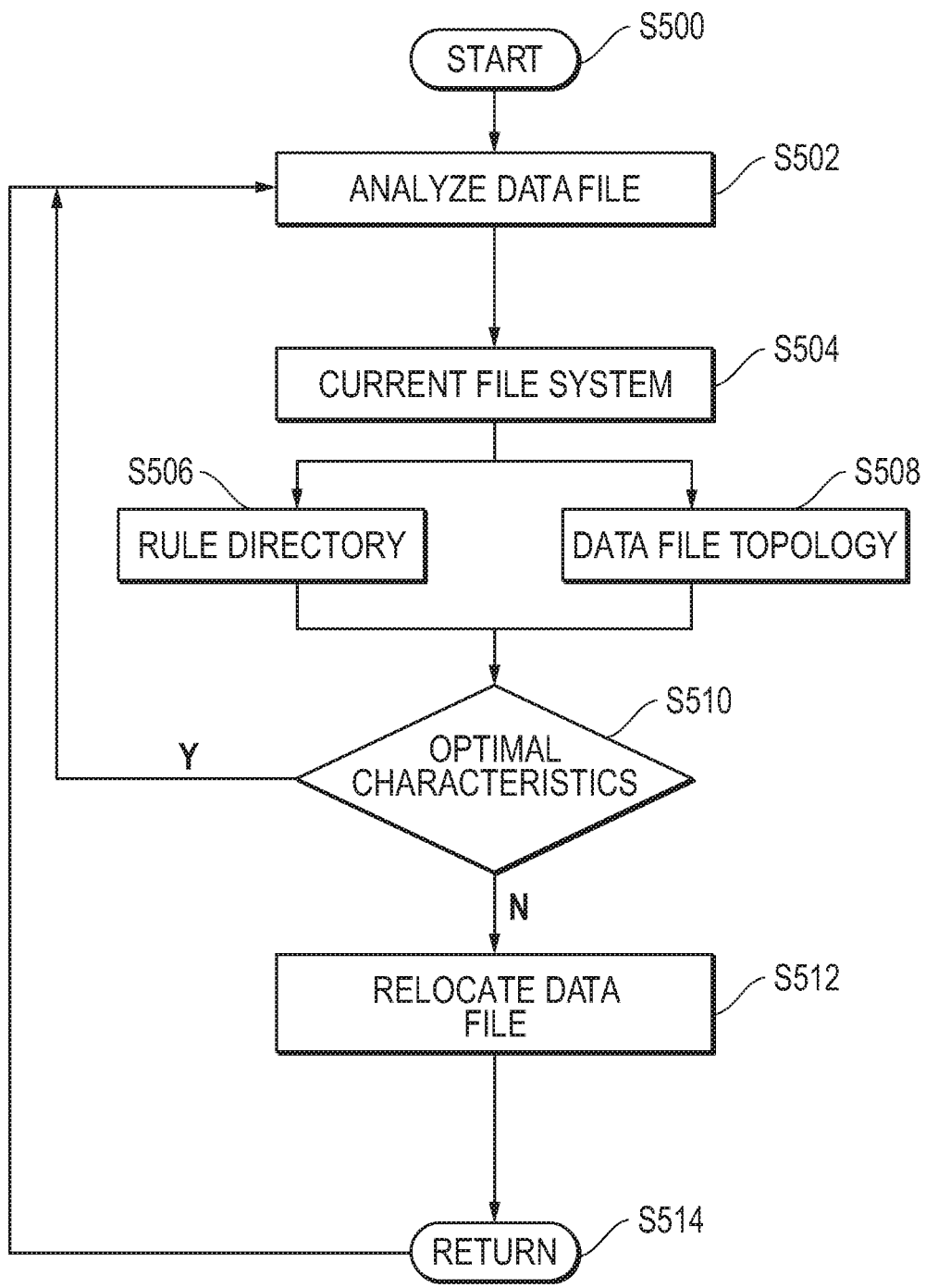
FIG. 5 is a flowchart depicting an example method of redistributing data within a single database in accordance with one exemplary implementation of an embodiment of the present invention.

One example implementation of the method of the embodiment is depicted in the block diagram of FIG. 5. Starting at block S500, the example method proceeds to block S502 that recites analyzing a data file. As noted herein, the analysis may include an analysis of the data file metadata conducted by an API. Proceeding to the current file system in block S504, the example method catalogs the data file according to its metadata. In blocks S506 and S508, the example method applies the rule directory and creates the data file topology, respectively. In response to the rule directory S506 and the data file topology S508, the example method queries whether the data file is aligned with the optimal characteristics of the file system on which it is stored in decision block S510.

If the response to decision block S510 is affirmative, then the example method returns to block S502, at which time the example method may begin the process anew. The timing upon which the example method repeats blocks S502 through S510 may be variable or constant, depending upon the application and desired outcome. For example, the example method may be employed to analyze and redistribute data files on a predetermined schedule in order to ensure that system resources are being used in the most efficient manner. A single data file might be among the most frequently modified at a first time, and yet at a later time rarely be accessed at all. As such, even if the response to decision block S510 is affirmative at a first time, the same data file may be analyzed at a second time to ensure that it is still located in the optimal file system according to the rule directory.

If the response to decision block S510 is negative, then the example method proceeds to block S512 in which the data file is relocated to a more desirable file system on the database as determined by the rule directory. As noted herein, the rule directory may specify for example that data files that are most frequently modified may be moved into a cache file system, whereas data files that are subject to error or corruption may be moved into a JFS2 file system. Other data file characteristics and suitable file system characteristics are noted herein. Block S514 recites that the example method returns to block S502 at which time the data file is reanalyzed in accordance with the rule directory and data file topology. As noted above, the example method may be employed on a continuous basis or on either a regular or variable interval in order to ensure that each data file resides in the file system that is most characteristically suited for storing the data file while maximizing the performance and efficiency of the database.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular terms "a", "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements and specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical applications, and to enable others of ordinary skill in the art to understand the invention for various embodiments with various modifications as are suited to the particular use contemplated.

What is claimed is:

1. A computer-implemented method comprising:
    on a single database, classifying a data set in response to metadata corresponding to one or more data files, wherein the data set and the one or more data files reside on the single database;
    creating a current data file topology of the database comprising a data file identifier, a data file location in the database and a data file system type, wherein the current data file topology functions to map each of the data files according to its location on the single database and the data file system type through which it is stored;
    receiving a predetermined rule directory corresponding with the single database comprising a set of features corresponding to one or more file systems, wherein each of the one or more file systems includes a different set of attributes and advantages for managing the data set of the single database;
    reading a system catalog of the single database to rank two or more data files of the single database in response to a frequency with which each of the two or more data files is accessed; and
    in response to the current data file topology and the predetermined rule directory, reorganizing the data set such that at least a portion of the data set is moved to one of a set of new file systems in the single database, each one of the new file systems having a predetermined optimized characteristic between the data set and the advantages of the one of the set of new file systems for handling, thereby creating a new data file topology, wherein the data set includes two or more data files stored in two or more distinct file systems as defined by the current data file topology and the new data file topology, and wherein the single database is partitioned into distinct partitions each comprising a distinct data set, and wherein the reorganizing each distinct data set moves at least a portion of the distinct data set to a different type of file system exclusive to the distinct data set.

2. The method of claim 1, further comprising analyzing the metadata corresponding to one or more data files with an application programming interface.

3. The method of claim 1, further comprising locating a more frequently accessed of the two or more data files in a cache file system; and locating the system catalog of the cache file system to another of the one or more file systems.

4. The method of claim 1, wherein the data set comprises at least two distinct types of data files.

5. The method of claim 1, wherein the data file comprises one of encrypted data, bootstrap data, application data, large object data, system data or enterprise data.

6. The method of claim 1, wherein the data file type comprises a data file system.

7. The method of claim 1, wherein the predetermined optimized characteristic comprises one of a read/write characteristic, a compression characteristic, an error-recovery characteristic, an error-failure characteristic or an error-handling characteristic.

8. The method of claim 1, further comprising rendering one or more data files accessible from a computer operatively coupled to a database on which the one or more files are located.

9. A computer program product comprising:
    a non-transitory computer readable storage medium having computer readable program code embodied therewith, the computer readable program code comprising:
        first computer readable program code to classify, on a single database, a data set in response to metadata corresponding to one or more data files wherein the data set and the one or more data files reside on the single database;
        second computer readable program code to create a current data file topology of the database comprising a data file identifier, a data file location in the database and a data file system type wherein the current data file topology functions to map each of the data files according to its location on the single database and the data file system type through which it is stored;
        third computer readable program code to receive a predetermined rule directory corresponding with the single database comprising a set of features corresponding to one or more file systems, wherein each of the one or more file systems includes a different set of attributes and advantages for managing the data set of the single database;
        fourth computer readable program code to reorganize the data set in response to the current data file topology and the predetermined rule directory, such that at least a portion of the data set is moved to one of a set of new file systems in the single database, each one of the new file systems having a predetermined optimized characteristic between the data set and the advantages of the one of the set of new file systems for handling, thereby creating a new data file topology, wherein the data set includes two or more data files stored in two or more distinct file systems as defined by the current data file topology and the new data file topology and wherein the single database is partitioned into distinct partitions each comprising a distinct data set, and wherein the reorganizing each distinct data set moves at least a portion of the distinct data set to a different type of file system exclusive to the distinct data set; and sixth computer readable program code to read a system catalog of the single database to rank two or more data files of the single database in response to a frequency with which each of the two or more data files is accessed.

10. The computer program product of claim 9, further comprising fifth computer readable program code to analyze the metadata corresponding to one or more data files with an application programming interface.

11. The computer program product of claim 9, further comprising seventh computer readable program code to locate a more frequently accessed of the two or more data files in a cache the system; and locating the system catalog of the cache the system to another of the one or more the systems.

12. The computer program product of claim 9, wherein the data set comprises at least two distinct types of data files.

13. The computer program product of claim 9, wherein the data the comprises one of encrypted data, bootstrap data, application data, large object data, system data or enterprise data.

14. The computer program product of claim 9, wherein the data the type comprises a data the system.

15. The computer program product of claim 9, wherein the predetermined optimized characteristic comprises one of a read/write characteristic, a compression characteristic, an error-recovery characteristic, an error-failure characteristic or an error-handling characteristic.

16. The computer program product of claim 9, further comprising eighth computer readable program code to render one or more data files accessible from a computer operatively coupled to a database on which the one or more files are located.

* * * * *